US005350154A

United States Patent [19]

Takama et al.

[11] Patent Number: 5,350,154

[45] Date of Patent: Sep. 27, 1994

[54] SUPPORT STRUCTURE FOR A CERAMIC VALVE ASSEMBLY

[75] Inventors: Kenichiro Takama, Toyota; Kimihide Horio, Susono; Michihiko Miyasaka, Kokubu; Takafumi Tsurumaru, Kokubu; Shinsuke Takenishi, Kokubu, all of Japan

[73] Assignee: Toyota Jidosha Kabushiki Kaisha, Aichi, Japan

[21] Appl. No.: 146,299

[22] Filed: Nov. 1, 1993

[30] Foreign Application Priority Data

| | | | |
|---|---|---|---|
| Nov. 2, 1992 | [JP] | Japan | 4-294418 |
| Mar. 31, 1993 | [JP] | Japan | 5-73283 |

[51] Int. Cl.[5] .......... F16K 1/22

[52] U.S. Cl. .......... 251/305; 251/308; 251/368

[58] Field of Search .......... 251/305, 308, 368; 137/454.6

[56] References Cited

U.S. PATENT DOCUMENTS

| | | | |
|---|---|---|---|
| 4,079,747 | 3/1978 | Roberts | 251/308 X |
| 4,822,001 | 4/1989 | Sish | 251/305 X |

FOREIGN PATENT DOCUMENTS

| | | |
|---|---|---|
| 59-119939 | 8/1984 | Japan . |
| 63-45037 | 3/1988 | Japan . |
| 63-162584 | 7/1988 | Japan . |

*Primary Examiner*—John C. Fox
*Attorney, Agent, or Firm*—Kenyon & Kenyon

[57] ABSTRACT

A ceramic valve assembly is housed in a recess formed in a metal pipe and is supported via gaskets by the metal pipes. Each gasket has a larger coefficient of linear expansion than that of the metal pipe. A clearance generated due to the thermal expansion difference between the metal pipe and the ceramic housing is absorbed by the large thermal expansion of the gasket so that no play is generated between the ceramic valve assembly and the metal pipe and the sealing force is maintained. Each gasket has beads constructed of spring material. An excessively large load does not act on the ceramic assembly because the beads are deformed to absorb the load.

15 Claims, 7 Drawing Sheets

SUPPORT STRUCTURE FOR A CERAMIC VALVE ASSEMBLY

BACKGROUND OF THE INVENTION

1. Field of the Invention

The present invention relates to a support structure for a ceramic valve assembly and is used as, for example, a support structure for supporting an exhaust control valve constructed of ceramic from a steel exhaust pipe of an internal combustion engine provided with a turbocharger.

2. Description of the Related Art

Internal combustion engines have included a twin turbocharger system, wherein two turbochargers are provided and an intake control valve and an exhaust control valve are installed in an intake conduit and an exhaust conduit, respectively, of one of the two turbochargers. This allows the turbocharger operation to be switched between a one-turbocharger-operation and a two-turbocharger-operation by opening and closing the intake and exhaust control valves. In these engines, the exhaust control valves are preferably constructed of ceramic to improve the valve's thermal durability, operation reliability, such as sticking prevention, and response characteristic through reduction of gas leakage.

However, since there is a difference in thermal expansion between the ceramic and the exhaust pipe material, a support structure of the exhaust control valve, i.e., an effective ceramic butterfly valve assembly from the exhaust pipe is needed. If the clearance is too small, the clearance cannot absorb the thermal expansion and an excessively large force will act on the ceramic member. Contrarily, if the clearance is too large, the ceramic valve assembly will cause vibration and may be broken due to collision with the metal member.

Japanese Utility Model Publication SHO 55-175663 proposes a support structure for a ceramic butterfly valve assembly, wherein a ceramic liner is attached to an inside surface of the annular metal housing and a ceramic butterfly valve through which a valve shaft penetrates, is disposed inside the ceramic liner so as to be rotatable about an axis of the valve shaft. However, if a very high temperature is applied to the structure, such as in the case of an exhaust control valve of an internal combustion engine with a turbocharger, the ceramic liner will be broken due to the thermal expansion difference between the metal valve housing and the ceramic liner. Further, since the ceramic liner is integrally attached to the valve housing, when leaping stones strike against the valve housing, the ceramic liner may be broken due to the impingement.

Further, in the apparatus of the above-described publication, since a central portion of the ceramic valve through which the valve shaft penetrates is large, a cross-sectional area of an exhaust gas flow passage is reduced and the transient response characteristic of the turbocharger is degraded. Furthermore, since the butterfly valve rotates to a position perpendicular to an axis of the ceramic liner when the valve is closed, foreign substances may engage the clearance between the valve and the liner causing a sticking with the valve housing.

SUMMARY OF THE INVENTION

An object of the invention is to provide a support structure for supporting a ceramic valve assembly from a metal pipe wherein a stable sealing force is maintained and no large play is generated between the ceramic member and the metal member.

Another object of the invention is to provide a ceramic valve assembly which can assure smooth rotation of the valve and can effectively suppress leakage of exhaust gas through the valve when the valve is closed.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
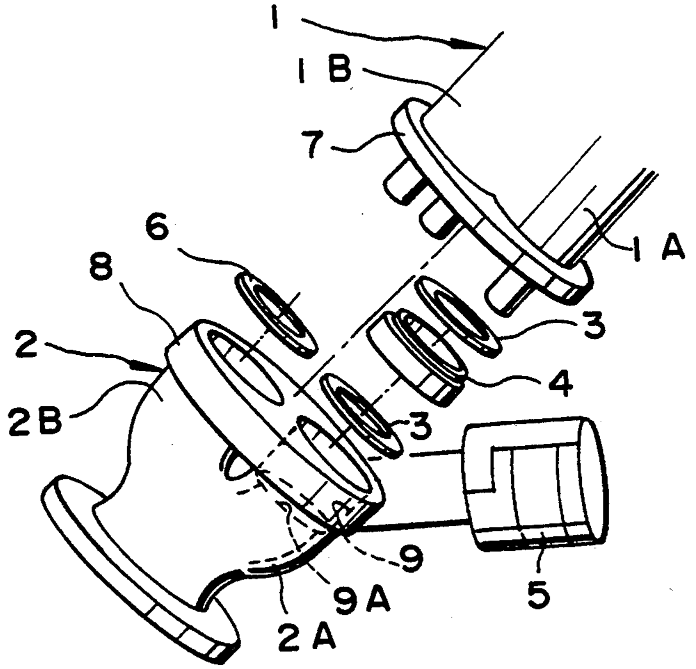
FIG. 1 is an oblique view of a support structure of a ceramic valve assembly in accordance with a first embodiment of the present invention.

Two embodiments of the invention will be explained. A first embodiment of the invention is directed to a support structure of a ceramic valve assembly and is illustrated in FIGS. 1-14. A second embodiment of the invention is directed to a ceramic valve assembly and is illustrated in FIGS. 15-18. Throughout all the embodiments, members having the same function are denoted with the same reference numerals.

Firstly, the first embodiment of the invention will be explained. As illustrated in FIG. 1, a support structure of a ceramic valve assembly in accordance with the first embodiment of the invention generally includes two metal pipes 1 and 2, a ceramic valve assembly 4, and gaskets 3 disposed between the valve assembly 4 and the two metal pipes 1 and 2.

Figure 2:
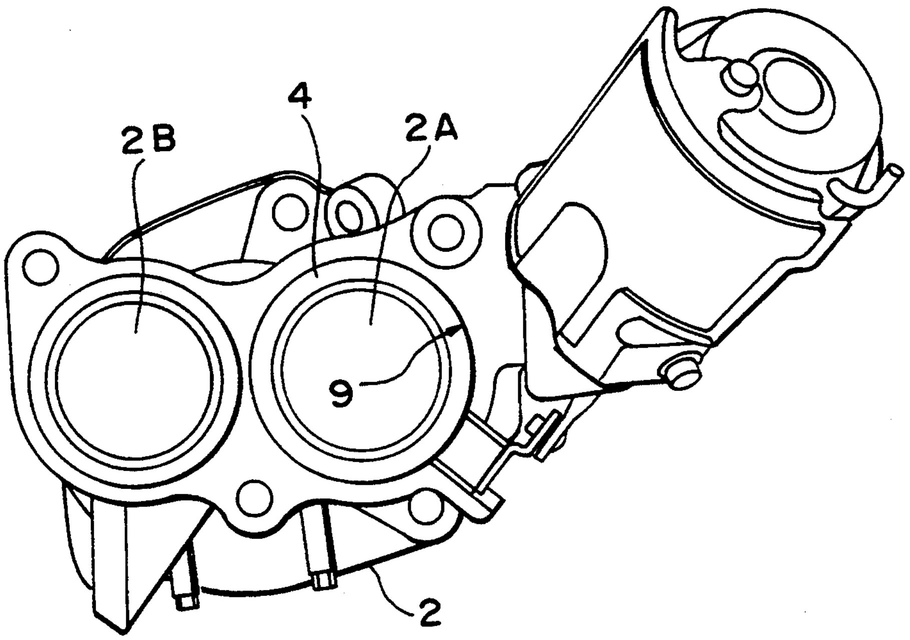
FIG. 2 is a plan view of a metal pipe of the structure of FIG. 1.
Figure 3:
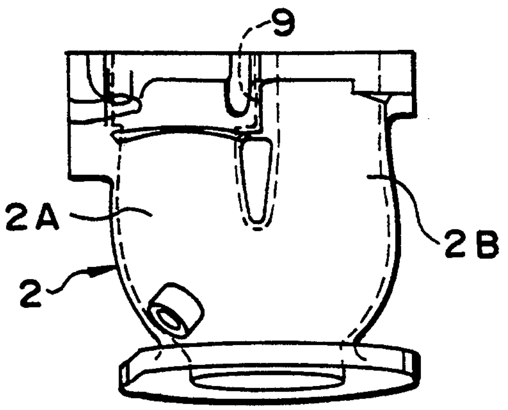
FIG. 3 is an elevational view of the metal pipe of FIG. 2.

As illustrated in FIGS. 1–3, the metal pipes 1 and 2 have flanges 7 and 8, respectively, and are connected to each other by bolts at the flanges. Each of the metal pipes 1 and 2 is constructed of a dual pipe. More particularly, the dual pipe 1 includes two pipe portions 1A and 1B which are integrally connected at the flange 7, and the dual pipe 2 includes two pipe portions 2A and 2B which are integrally connected at the flange 8. The two pipe portions 2A and 2B are combined into a single pipe portion at downstream ends thereof.

As illustrated in FIGS. 1 and 3, a recess 9 is formed in an inner portion of the flange 8 of a portion 2A of one of the two metal pipes 2. The recess 9 has a step 9A distanced from a pipe end and ends at the step 9A in an axial direction of the recess 9. The recess 9 is coaxial with the pipe portion 2A and has a diameter larger than an inner diameter of the pipe portion 2A. The ceramic valve assembly 4 is mounted within the recess 9.

Figure 4:
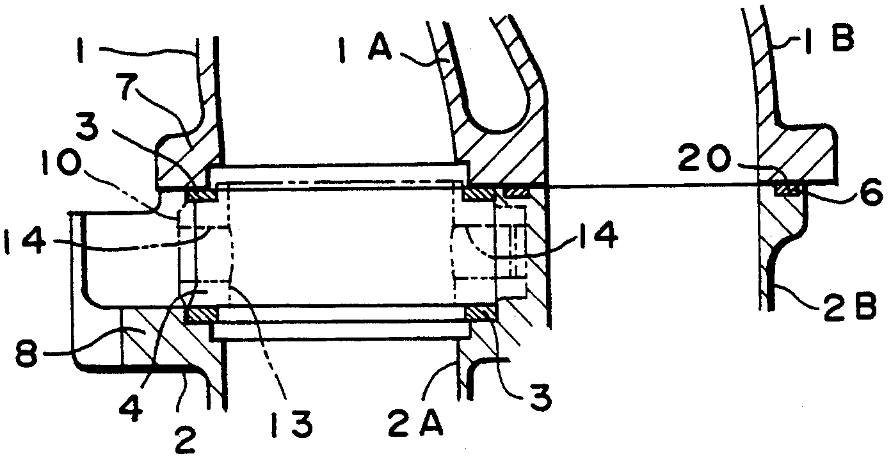
FIG. 4 is an enlarged cross-sectional view of a portion of the structure of FIG. 1.
Figure 5:
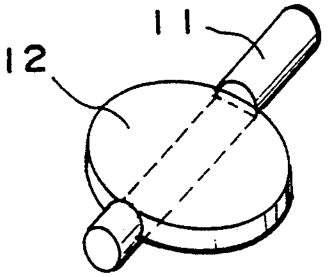
FIG. 5 is an oblique view of a shaft and a valve of a ceramic valve assembly of the structure of FIG. 4.
Figure 6:
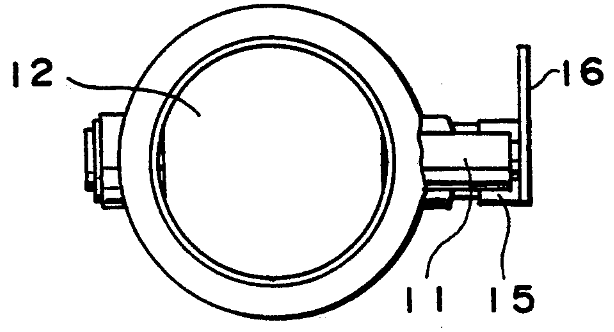
FIG. 6 is a plan view of the shaft and the valve of FIG. 5.
Figure 7:
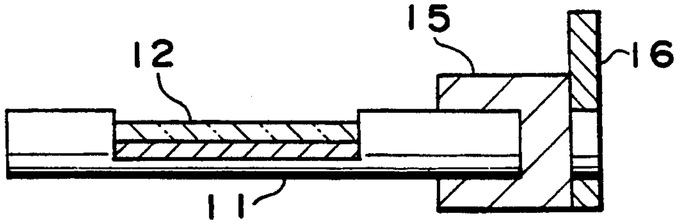
FIG. 7 is an elevational view of the shaft and the valve of FIG. 5.

The ceramic valve assembly 4 includes a ceramic housing 10 illustrated in FIG. 4, a ceramic shaft 11 illustrated in FIGS. 5–7, and a ceramic valve 12. The ceramic housing 10 includes a substantially cylindrical wall defining a bore 13 inside the wall. Shaft support bores 14 are formed in the wall and extend perpendicularly to a longitudinal axis of the ceramic housing 10. The ceramic shaft 11 has opposed ends rotatably supported by the shaft support bores 14 so as to be rotatable about an axis of the shaft 11 relative to the housing 10. The ceramic valve 12 is fixedly coupled to the ceramic shaft 11 and is disposed in the bore formed inside the housing 10. The valve 12 rotates together with the shaft 11 relative to the housing 10. The ceramic constructing the housing 10, the shaft 11, and the valve 12 may be, for example, silicon nitride. The shaft 11 and the valve 12 may be integrally formed or may be constructed to separate pieces and then be integrated into one piece through, for example, diffusion bonding.

As illustrated in FIG. 7, a metal collar 15 is fixedly coupled to one end of the ceramic shaft 11 through silver brazing, and a metal lever 16 is fixedly coupled to the collar 15. As illustrated in FIG. 1, an actuator 5 is coupled to the metal lever 16 and rotates the ceramic valve 12 about the axis of the ceramic shaft 11 via the metal lever 16 and the metal collar 15 to open and close the valve 12. The actuator 5 includes a diaphragm type actuator having a diaphragm chamber to which a charging pressure an intake manifold vacuum pressure is introduced via a pressure leading conduit. A duty-control solenoid valve is installed in the pressure leading conduit so that the valve 12 is opened to an arbitrary opening degree.

Figure 8:
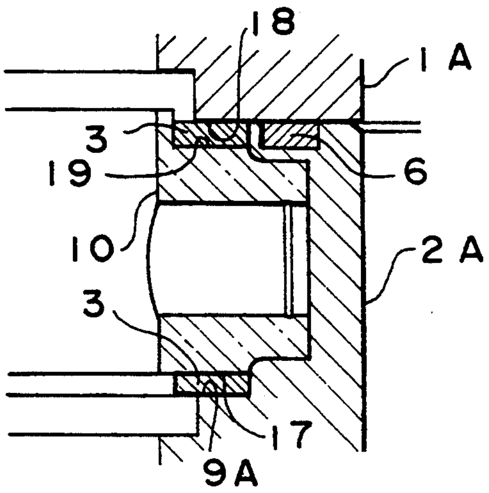
FIG. 8 is an enlarged cross-sectional view of a gasket and the vicinity thereof of the ceramic butterfly valve assembly of FIG. 5.
Figure 10:
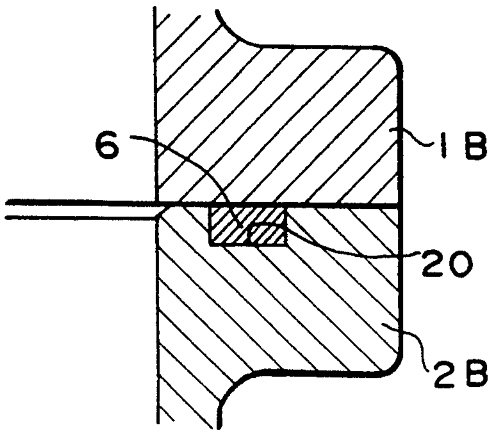
FIG. 10 is a cross-sectional view of another gasket and the vicinity thereof, used in the structure of FIG. 1.

As illustrated in FIGS. 4 and 8, the gaskets 3 are disposed between the step 9A of the recess 9 of the portion 2A of one of the metal pipes 2 and an end surface 17 of the housing 10 opposing the step 9A and between an end surface 18 of the flange 7 of the pipe portion 1A of the other metal pipe 1 and an end surface 19 of the housing opposing the flange 7, respectively. Further, as illustrated in FIGS. 10 and 4, a groove 20 is formed around the bore of the pipe portion 2B of the metal pipe 2, and another gasket 6 is disposed in the groove 20. The gasket 6 is separate from the gasket 3.

Figure 9:
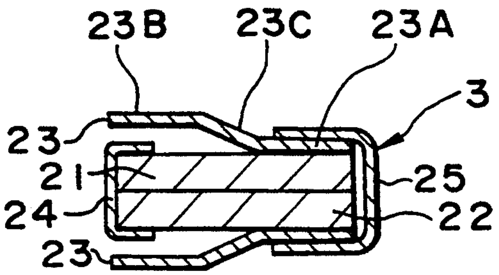
FIG. 9 is an enlarged cross-sectional view of the gasket of FIG. 8.

Each of the gaskets 3 has a larger coefficient of linear expansion than the two metal pipes 1 and 2. As illustrated in FIG. 9, the gasket 3 includes at least one, and may include two annular plates 21 and 22 constructed of stainless steel for adjustment of the coefficient of linear expansion, beads 23 constructed of spring metal and disposed on axially opposite sides of the annular plates 21 and 22, and grommets 24 and 25 constructed of stainless steel and provided at inner and outer portions of the annular plates 21 and 22 and binding the annular plates 21 and 22 and the beads 23 together. The bead 23 has a first portion 23A contacting the annular plates 21 and 22, a second portion 23B located apart from the annular plates 21 and 22 in a free, non-restricted condition of the bead, and a third portion 23C connecting the first portion 23A and the second portion 23B. The second portion 23B is pushed toward the annular plates 21 and 22 when the gaskets 3 are squeezed between the valve assembly and the metal pipes.

More particularly, the coefficients of linear expansion of the metal of the pipe 2, ceramic, and stainless steel (SUS 304) are $14.7\times10^{-6}$, $3.2\times10^{-6}$, and $18.9\times10^{-6}$, respectively. Therefore, when the gasket 3 is assembled with the bead 23 pressed against the opposing surface 9A at a room temperature, a clearance generated at high temperatures due to a thermal expansion difference between the metal pipe 2 and the ceramic housing 10 is absorbed by the large thermal expansion of the annular plates 21 and 22. As a result, the contacting pressure with which the bead 23 is pressed against the opposing surface 9A, 22 will not be weakened and the sealing effect between the flanges is maintained. Further, deformation of the bead 23 prevents an excessively large force from acting on the ceramic housing 10 and prevents the ceramic housing 10 from being broken due to the thermal expansion difference between the ceramic housing 10 and the metal pipe 2.

Figure 11:
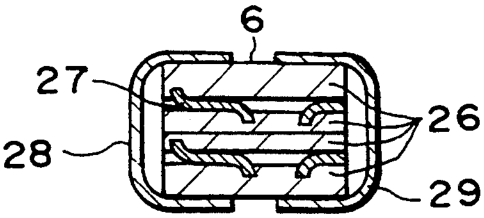
FIG. 11 is an enlarged cross-sectional view of the gasket of FIG. 10.

As illustrated in FIG. 11, the gasket 6 is constructed of a piled-up assembly of graphite plates 26 and waved stainless steel plates 27 which are bound by grommets 28 and 29 at an inner portion and an outer portion of the piled-up assembly. Further, to minimize a gas flow passing through a clearance between the valve 12 and the bore 13 when the valve 12 is closed, the clearance between the valve 12 and the bore 13 is set to be small. Similarly, to minimize a gas leakage through the shaft 11 and the shaft support bore 14, a clearance between the shaft 11 and the shaft support bore 14 is set to be small.

Figure 12:
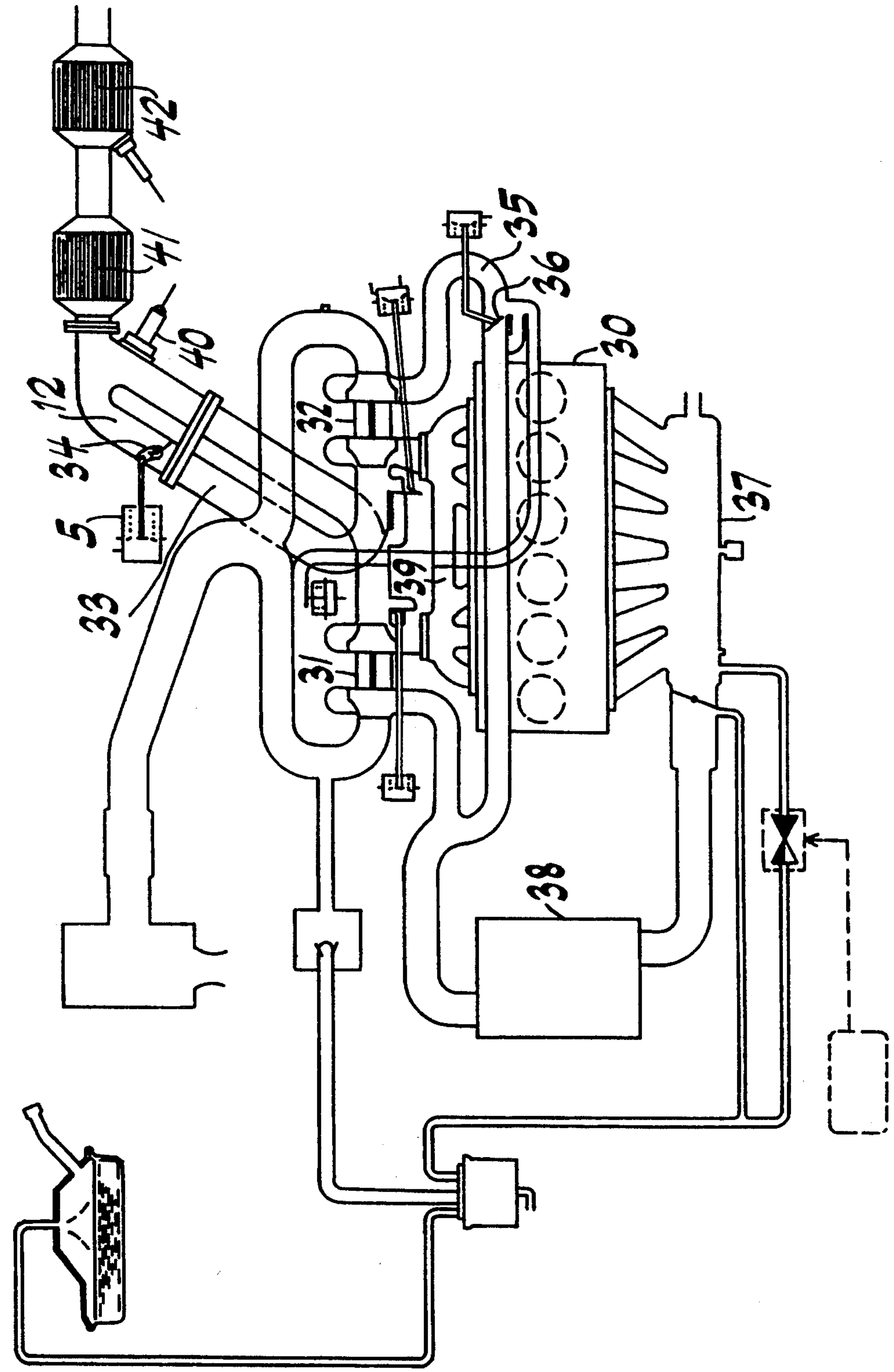
FIG. 12 is a schematic system diagram of an internal combustion engine with a twin turbocharger system having an exhaust control valve to which the structure of FIG. 1 is applied.
Figure 13:
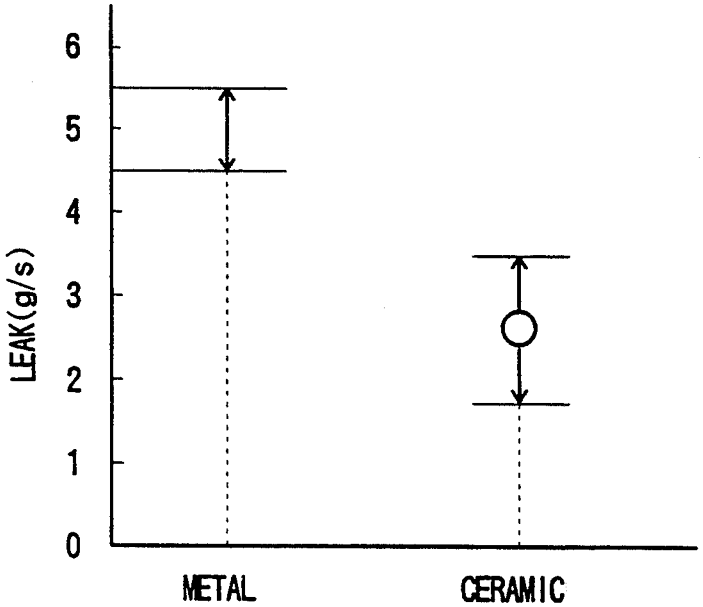
FIG. 13 is a graphical presentation of gas leakage amounts in cases of a ceramic valve assembly and a metal valve assembly.

FIG. 12 illustrates an application of the above-described support structure of a ceramic valve assembly to a support structure of an exhaust control valve installed in an exhaust conduit of an internal combustion engine with a dual turbocharger system. Two turbochargers 31 and 32 are provided in parallel with each other with respect to the internal combustion engine 30. One turbocharger 31 is operated throughout an entire range of intake air quantities, and the other turbocharger 32 is operated only at large intake air quantities. To switch the engine operation between a one-turbocharger-operation wherein the turbocharger 31 only is operated and a two-turbocharger-operation wherein the turbochargers 31 and 32 are operated, an exhaust control valve 34 is installed in an exhaust conduit 33 connected to a turbine of the turbocharger 32, and an intake control valve 36 is installed in an intake conduit 35 connected to a compressor of the turbocharger 32. When the exhaust control valve 34 and the intake control valve 36 are closed, the turbocharger 32 is stopped and only the turbocharger 31 is operated, so that the one-turbocharger-operation is produced. When the exhaust control valve 34 and the intake control valve 36 are opened, the turbocharger 32 is operated and both the turbochargers 31 and 32 are operated, so that the two-turbocharger-operation is produced. In FIG. 12, references 37, 38, 39 and 40 show a surge tank, a positive pressure holding tank, an exhaust manifold, and an oxygen sensor, respectively, and references 41 and 42 show catalytic convertors. The exhaust control valve 34 may be exposed to a very high temperature of the exhaust gas above 1,000° C.

Operation of the first embodiment of the invention will now be explained.

Since the gasket 3, having beads 23, is used in the support structure of the ceramic valve assembly, an appropriate sealing pressure operates between the beads 23 and the opposing surfaces so that the ceramic housing 10 is not damaged or broken and the stable sealing force is assured.

Further, when the exhaust control valve 34 is opened and the ceramic valve assembly is exposed to high temperature exhaust gas, an axial clearance tends to increase due to the thermal expansion difference between the metal pipe 2 and the ceramic housing 10. However, the increasing clearance will be absorbed by an axial thermal expansion of the gasket 3 having a larger coefficient of linear expansion than the metal pipe 2, so that the clearance will not increase and the sealing force is not weakened. As a result, a play will not be generated, and a stable sealing is maintained.

Further, since the ceramic valve assembly 4 is housed in the recess 9 of the metal pipe 2 and is externally surrounded by the metal members 1 and 2, leaping stones do not directly strike against the ceramic members and the ceramic members will not be broken due to the impingement.

Furthermore, since a change of clearances between the housing 10 and the valve 12, and between the shaft 11 and the shaft support bore 14, is very small because the members are constructed of ceramic having relatively small coefficients of linear expansion, the clearances can be set very small. As a result, gas leakage is minimized and a high transient response of the engine will be obtained.

Figure 14:
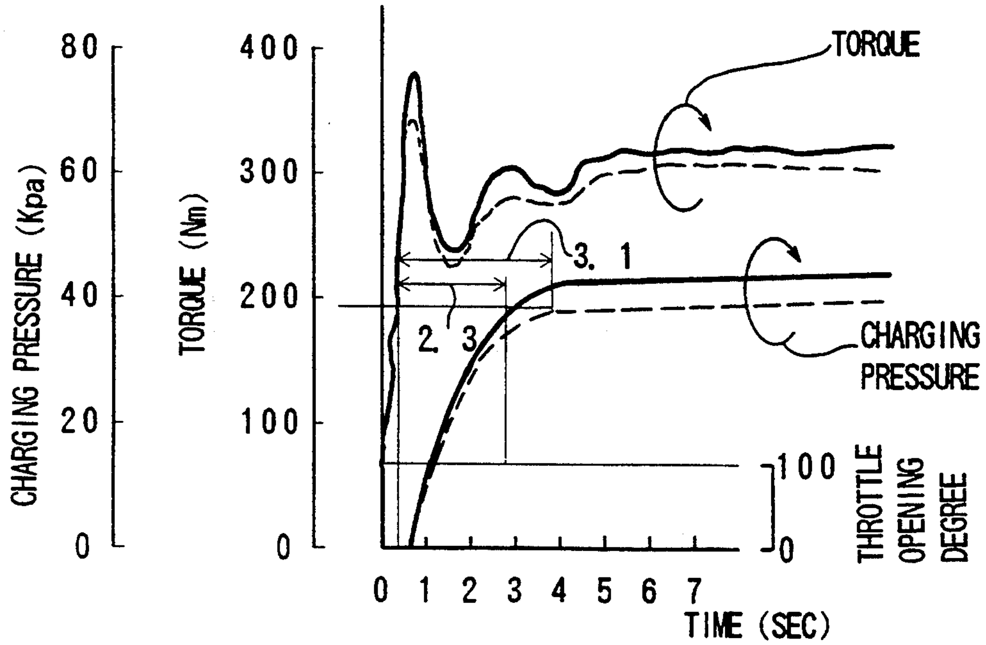
FIG. 14 is a graphical presentation of transient response characteristics in cases of a ceramic valve assembly and a metal valve assembly.

FIG. 14 illustrates an improvement of the transient response characteristic of the internal combustion engine with a turbocharger system as shown in FIG. 12. An increase in the torque and charging pressure versus time characteristic since the throttle valve is opened is shown in FIG. 14. The broken line shows the conventional case of the metal valve assembly and the full line shows the case of the ceramic valve assembly. As seen from FIG. 14, the ceramic valve assembly improves the running-up characteristic of the engine when only the first turbocharger 31 is operated, because the amount of a portion of exhaust gas escaping into the exhaust conduit 33 of the second turbocharger 32 is small due to the above-described small clearances.

Figure 15:
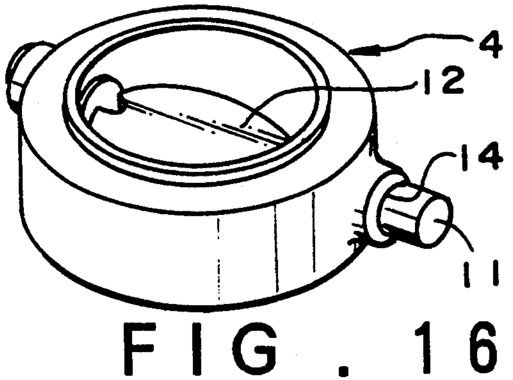
FIG. 15 is an oblique view of a ceramic valve. assembly in accordance with a second embodiment of the invention.
Figure 16:
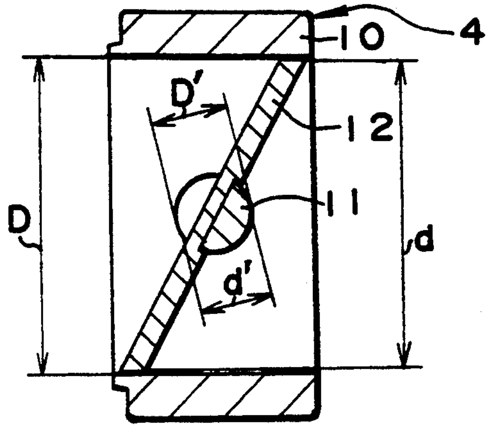
FIG. 16 is a cross-sectional view of the valve assembly of FIG. 15.
Figure 17:
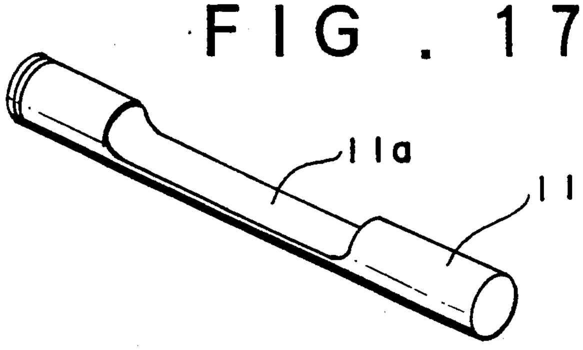
FIG. 17 is an oblique view of a shaft of the valve assembly of FIG. 15.
Figure 18:
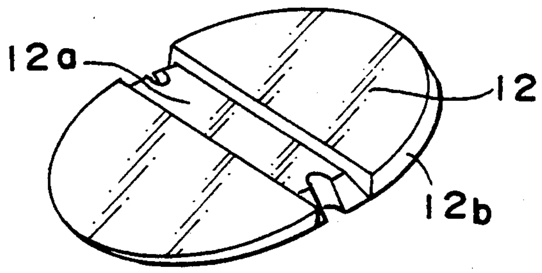
FIG. 18 is an oblique view if a valve of the valve assembly of FIG. 15.

Next, the second embodiment of the invention will be explained with reference to FIGS. 15–18. In the second embodiment of the invention, as illustrated in FIG. 17, the ceramic shaft 11 has a facet 11*a* at a longitudinally central portion, on an upstream side of the shaft 11, and as illustrated in FIG. 18, the ceramic butterfly valve 12 is oval and has a groove 12*a* extending in a diametrical direction of the valve 12 and having a flat grooved bottom surface. As illustrated in FIG. 15, the ceramic shaft 11 and the ceramic valve 12 are then integrated with the facet 12*a* and the grooved bottom surface abutted. In the integration, a silicon wafer is inserted between the facet 11*a* of the shaft 11 and the grooved bottom surface of the valve 12, and then the ceramic shaft 11, the ceramic valve 12, and the silicon wafer are heated, under a vacuum condition, to a temperature above the melting point of the silicon, so that the shaft 11 and the valve 12 are integrated.

The silicon wafer preferably has a purity of more than 99.9%. Alternatively, the silicon wafer may be replaced by a silicon coating. More particularly, powdered silicon and organic solvent may be mixed into a paste and the paste is coated on at least one of the facet 11*a* and the grooved bottom surface. The heating temperature is selected to a temperature above 1410° C. which is the melting temperature of silicon and below 1550° C. at which temperature decomposition of sintered silicon nitride is begun, and preferably to a temperature in the range of 1430° C. to 1500° C. Further, the ambient condition is selected to a vacuum having a pressure below $1\times10^{-1}$ mm Hg, and preferably the partial pressure of oxygen is set to a pressure below $1\times10^{-2}$ mm Hg and air is replaced by argon (Ar).

In the valve assembly of the second embodiment of the invention, a ratio of a difference (D-d) between an inner diameter (D) of the ceramic housing 10 and an outer diameter (d) of the ceramic valve 12, measured in a plane perpendicular to the axis of the ceramic housing 10, when the valve is closed, to the outer diameter (d) of the ceramic valve 12, measured in a plane perpendicular to the axis of the ceramic housing, is set in a range of 0.03% to 3%, and preferably in a range of 0.03% to 2%. This is because if the ratio is below 0.02%, a thermal expansion difference is unlikely to be absorbed, and if the ratio is greater than 3%, a gas leakage through the valve when the valve is closed will be intolerably increased.

Further, the ratio of a difference (D′−d′) between an inner diameter (D′) of the shaft support bore 14 formed in the ceramic housing 10 and an outer diameter (d′) of the ceramic shaft 11, to the outer diameter (d′) of the ceramic shaft 11, is set in a range of 0.05% to 5%, and preferably in a range of 0.05% to 2%. This is because if the ratio is less than 0.05%, the thermal expansion difference will not be absorbed and sticking will occur, and if the ratio is greater than 5%, gas leakage to atmosphere through a clearance between the shaft and the housing and a play of the valve relative to the housing will be intolerably increased.

For the purpose of evaluating the ceramic valve assembly of the second embodiment of the invention, the following valve assemblies were manufactured. Powders of silicon nitride ($Si_3N_4$) and sinter promoting material such as yttria ($Y_2O_3$) were mixed and fired to sintered silicon nitride test pieces of the ceramic housing having an inner diameter of 50 mm, a plurality of ceramic shafts having different outer diameters, and a plurality of ceramic valves having different diameters. The ceramic shafts and the ceramic valves were bonded together by inserting a silicon wafer between the two and then heating the assembly under a vacuum of $1\times10^{-3}$ mm Hg at 1475° C. for thirty minutes. The members were assembled into valve assemblies.

The valve assemblies were mounted into the test apparatus of a gasoline engine and durability tests were conducted. In the tests, the valves were repeatedly opened and closed in exhaust gas at 950° C.

It was seen from the tests that when the ratio, (D-d)/D was set below 0.02%, rotation of the valve was unsmooth, and when the ratio (D'−d')/D' was set below 0.04%, rotation of the valve shaft was unsmooth. When the ratios were set other than above, rotation of the valve and rotation of the valve shaft were maintained smooth even in two hundred thousand opening and closing cycles.

Then, the manufactured valve assemblies, in which the ratio (D'−d')/D' was 0.4% and the ratio (D−d)/D was varied, were mounted via a gasket in a pipe which connected a blower and a gas flow meter. Then, gas having the pressure 2 kg/cm$^2$ was flown through the pipe, and the valve was maintained in a closed condition. The amount of gas passing through a clearance between the housing and the closed valve was measured. It was found from the test results that the amount of gas leaking the clearance between the housing and the closed valve was very small when the ratio, (D−d)/D was smaller than 3%, that the leaking gas amount in the case where the ratio was 4% was about 1.33 times that in the case where the ratio was 3%, and that the leaking gas amount in the case where the ratio was 5% was about 2 times that in the case where the ratio was 3%.

Further, the manufactured valve assemblies, in which the ratio (D−d)/D was 0.4% and the ratio (D'−d')/D' was varied, were mounted via a gasket in a pipe which connected a blower and a gas flow meter. Then, gas having the pressure 2 kg/cm$^2$ was flown through the pipe, and the valve was maintained in a closed condition. The amount of gas passing through a clearance between the valve shaft and the shaft support bore was measured. It was found from the test results that the amount of gas leaking through the clearance between the valve shaft and the shaft support bore was very small when the ratio (D'−d')/D' was smaller than 5%, and that the amount of gas leaking in the case where the ratio was 6% was about 2.49 times that in the case where the ratio was 5%, and that the amount of gas leaking in the case where the ratio was 7% was about 4.47 times that in the case where the ratio was 5%.

Then, using the ceramic valve assemblies for tests, detaching strengths of the valve-shaft assemblies were evaluated after thermal cycles were given. In the tests, the ceramic shafts were supported and the ceramic valves were pressed in a direction away from the shafts, and the loads when the ceramic valves were detached from the shafts were measured.

In the case where the valve and shaft assemblies were heated and cooled between −40° C. and 300° C., the average detaching strength after one hundred thermal cycles was 101.5 Kgf, and the average detaching strength after two hundred thermal cycles was 107.6 kgf, while the detaching strength before the thermal cycles was 103.2 kgf. Further, in the case where the valve and shaft assemblies were heated and cooled between 100° C. and 950° C., the average detaching strength after one thousand thermal cycles was 113.8 kgf, and the average detaching strength after two thousand and five hundred thermal cycles was 108.7 kgf, while the detaching strength before the thermal cycles was 103.2 Kgf. These test results show that the detaching strength was not decreased in any case.

Further, in the case where the valve and shaft assemblies were left in the gas of 950° C. for one thousand hours, the average detaching strength was 105.3 Kgf, while the average detaching strength before durability tests was 103.2 Kgf. These test results show that the detaching strength was not decreased in any case.

In accordance with the present invention, the following advantages are obtained:

First, since the clearance generated due to the thermal expansion difference between the metal pipes and the ceramic housing is absorbed by the thermal expansion of the gaskets, the sealing force is maintained and no play is generated.

Second, since the ceramic valve assembly is surrounded by the metal pipes, breakage of the ceramic valve assembly due to striking of leaping stones is prevented.

Third, since a clearance between the valve and the housing and a clearance between the valve shaft and the shaft support bore are set in respective predetermined ranges, gas leakage at the valve can be suppressed.

Fourth, since the valve and the valve shaft are bonded with the facet and the grooved bottom surface abutted, the size in the vicinity of the axis of the valve assembly can be small, and the cross-sectional area of the gas flow passage is maintained large.

Last, due to the small gas leakage and the large passage cross-sectional area, the transient response characteristic is improved when the structure is applied to an exhaust control valve installed in an exhaust gas conduit of an internal combustion engine with a turbocharger.

Although only a few embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A support structure of a ceramic valve assembly comprising:

(a) two metal pipes having flanges, the metal pipes being connected to each other at the flanges, one of the two pipes having a recess at a radially inner portion of the flange, the recess having a step at an axial end thereof;

(b) a ceramic valve assembly including:

a ceramic housing having a substantially cylindrical wall defining a first bore inside the wall and two shaft support bores formed in the wall, each shaft support bore extending substantially perpendicularly to a longitudinal axis of the ceramic housing;

a ceramic shaft having opposed ends rotatably supported by the shaft support bores; and a ceramic butterfly valve fixedly coupled to the ceramic shaft so as to be rotatable together with the ceramic shaft within the first bore; and (c) a first gasket disposed between the ceramic housing and the step of the recess and a second gasket disposed between the housing and the flange of the other of the two pipes, respectively, each gasket having a larger coefficient of linear expansion than said two metal pipes.

2. A structure according to claim 1, wherein the ceramic valve assembly is housed in the recess formed in said one of the two pipes and is externally surrounded by the two metal pipes when the two metal pipes are connected to each other.

3. A structure according to claim 1, further comprising:

(a) a metal collar fixedly coupled to one end of the ceramic shaft;

(b) a metal lever coupled to the collar; and (c) an actuator operatively coupled to the metal lever to rotate the ceramic valve about an axis of the ceramic shaft via the metal lever and the metal collar.

4. A structure according to claim 1, wherein each of the gaskets comprises:

(a) at least one annular plate constructed of stainless steel;

(b) a plurality of beads constructed of spring metal and disposed on axially opposite sides of the annular plate; and (c) a plurality of grommets constructed of stainless steel provided at inner and outer portions of the at least one annular plate, each grommet binding the at least one annular plate and a corresponding bead together.

5. A structure according to claim 4, wherein two annular plates of stainless steel are provided and the two annular plates are bound together by the grommets.

6. A structure according to claim 4, wherein each of the beads includes a first portion contacting the annular plate, a second portion located apart from the annular plate, and a third portion connecting the first portion and the second portion, the second portion being pushed toward the at least one annular plate when the gaskets are squeezed between the ceramic valve assembly and the metal pipes.

7. A structure according to claim 1, installed in an exhaust conduit connected to one turbocharger of an internal combustion engine, wherein the engine includes a twin turbocharger system and the structure operates so as to open and close the exhaust conduit.

8. A structure according to claim 1, wherein the ceramic valve is oval and has a peripheral surface which moves toward and away from an inside surface of the ceramic housing to open and close the valve.

9. A structure according to claim 8, wherein a ratio of a difference between an inner diameter of the ceramic housing and an outer diameter of the ceramic valve, measured in a plane perpendicular to the axis of the ceramic housing, when the valve is closed, to said outer diameter of the ceramic valve, measured in a plane perpendicular to the axis of the ceramic housing, is set in a range of 0.03% to 3%.

10. A structure according to claim 9, wherein the ratio is set in a range of 0.03% to 2%.

11. A structure according to claim 8, wherein a ratio of a difference between an inner diameter of the shaft support bore and an outer diameter of the ceramic shaft, to the outer diameter of the ceramic shaft is set in a range of 0.05% to 5%.

12. A structure according to claim 11, wherein the ratio is set in a range of 0.05% to 2%.

13. A structure according to claim 1, wherein the ceramic shaft has a facet at a longitudinal central portion of the ceramic shaft, and the ceramic valve has a groove extending in a diametrical direction of the ceramic valve and having a flat grooved bottom surface, and wherein the ceramic shaft and the ceramic valve are integrated with the facet of the ceramic shaft and the grooved bottom surface of the ceramic valve abutted.

14. A structure according to claim 13, wherein the ceramic shaft and the ceramic valve are integrated by inserting a silicon wafer between the facet of the ceramic shaft and the grooved bottom surface of the ceramic valve and heating the ceramic shaft, the ceramic valve, and the silicon wafer to a temperature above a melting point of the silicon wafer.

15. A structure according to claim 1, wherein the ceramic housing, the ceramic shaft, and the ceramic valve are constructed of sintered silicon nitride.

* * * * *

UNITED STATES PATENT AND TRADEMARK OFFICE

CERTIFICATE OF CORRECTION

PATENT NO. : 5,350,154

DATED : September 27, 1994

INVENTOR(S) : Kenichiro TAKAMA, et al.

It is certified that error appears in the above-indentified patent and that said Letters Patent is hereby corrected as shown below:

Column 1, line 44, "However," should start a new paragraph.

Column 2, line 49, delete the period after "valve".

Column 2, line 56, change "if" to --of--.

Column 3, line 43, change "to" to --of--.

Column 3, line 55, between "pressure" and "an" insert --or--.

Column 10, line 31, change "abutted" to --abutment--.

Signed and Sealed this

Seventh Day of March, 1995

Attest:

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,350,154

DATED : September 27, 1994

INVENTOR(S) : Kenichiro TAKAMA, et al.

It is certified that error appears in the above-indentified patent and that said Letters Patent is hereby corrected as shown below:

On title page, item , [73] Assignee:, under "TOYOTA JIDOSHA KABUSHIKI KAISHA, Aichi, Japan, add --KYOCERA CORPORATION, Kagoshima-ken, Japan--.

Signed and Sealed this

Nineteenth Day of September, 1995

*Attest:*

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,350,154
DATED : Sep. 27, 1994
INVENTOR(S) : Kenichiro Takama, et al It is certified that error appears in the above-indentified patent and that said Letters Patent is hereby corrected as shown below:

IN THE TITLE PAGE: [73] Assignee: Change "Aichi, Japan" to --Toyota-shi, Japan;-- and add --KYOCERA CORPORATION, Kokubu-shi, Japan--.

This certificate supersedes Certificate of Correction issued Sept. 19, 1995.

Signed and Sealed this
Fifth Day of December, 1995

*Attest:*

Bruce Lehman

BRUCE LEHMAN

*Attesting Officer*

*Commissioner of Patents and Trademarks*